UNITED STATES PATENT OFFICE.

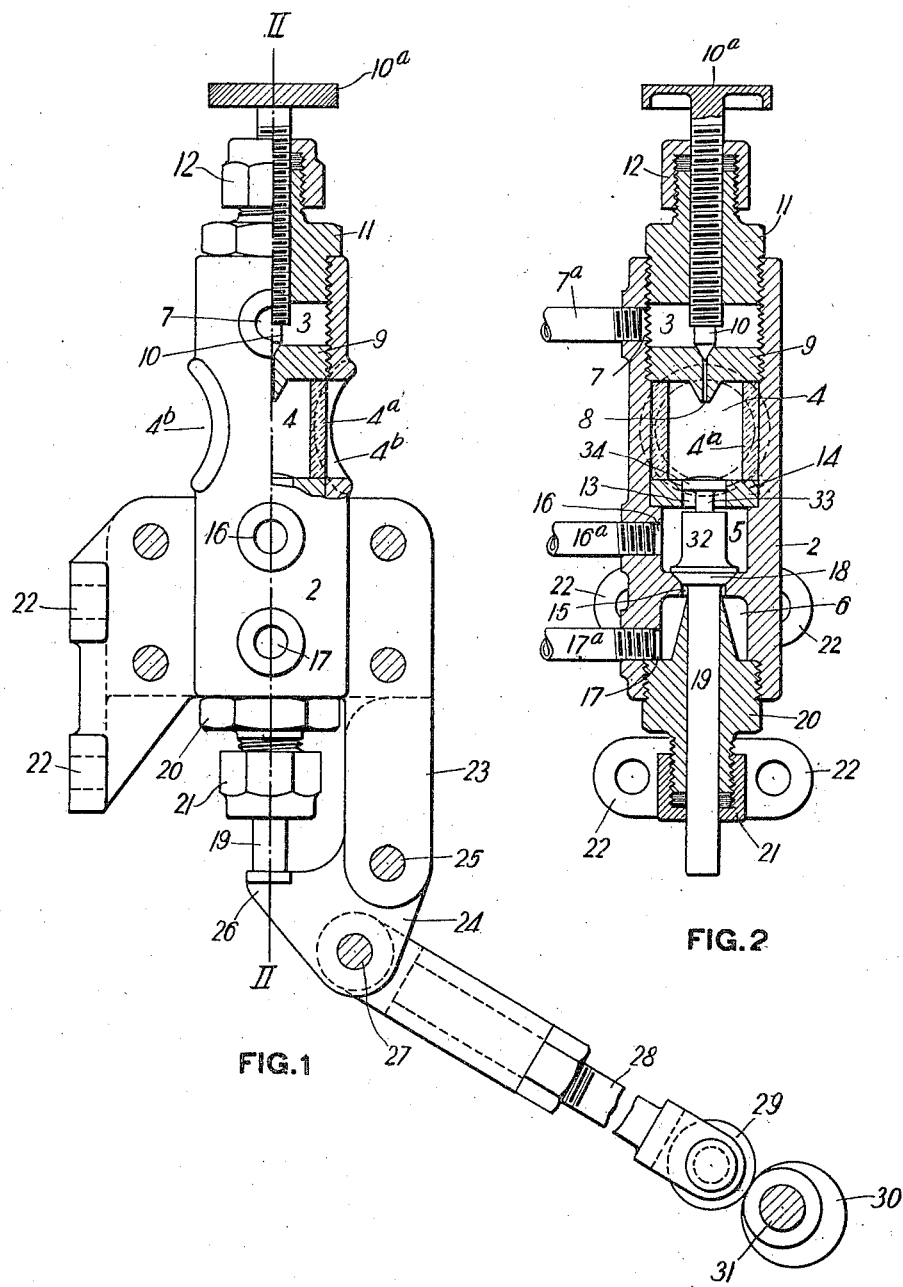

JAMES HORTON, OF MUNHALL, AND THOMAS W. KEEN, OF SWISSVALE, PENNSYLVANIA.

LUBRICATOR.

1,032,361.　　　　　Specification of Letters Patent.　　Patented July 9, 1912.

Application filed February 9, 1912. Serial No. 676,491.

*To all whom it may concern:*

Be it known that we, JAMES HORTON and THOMAS W. KEEN, both citizens of the United States, and residents, respectively, of Munhall and of Swissvale, both in the county of Allegheny and State of Pennsylvania, have invented a new and useful Lubricator, of which the following is a specification, reference being had to the accompanying drawings, forming a part of this specification.

Our invention relates to lubricators used in supplying oil or other lubricant to engines or other points of use, and more particularly relates to lubricators employed in supplying and controlling the supply of lubricant to the interior of gas engine cylinders.

Heretofore in lubricating gas engine cylinders, particularly with the large engines employing blast furnace gases as fuel, the oil or other lubricant has always been introduced into the cylinder at times when the reciprocating cylinder piston is not covering the inlet opening or openings through which the lubricant is supplied to the cylinder or in other words the lubricant is spread over the surface of the engine cylinder and the piston is lubricated in passing over the lubricant covered surface of the cylinder.

One object of our invention is to provide a lubricator having novel means whereby the lubricant is intermittently supplied to such cylinders in the form of spray at predetermined intervals, and is caused to enter the cylinder and be delivered directly on the wearing faces of the cylinder pistons, rings and in spaces between.

Another object of our invention is to provide a lubricator of improved construction having novel means whereby the lubricant is delivered in regulated quantities and is caused to travel into and through the lubricator to the engine cylinder or other point of use.

Referring to the accompanying drawings Figure 1 is a side elevation partly in section showing a lubricator constructed and arranged in accordance with our invention.
Fig. 2 is a sectional elevation, the section being taken on the line II—II of Fig. 1.

In the accompanying drawings 2 designates the lubricator having a supply chamber 3, and drop chamber 4, a pressure chamber 5 and discharge chamber 6. A short piece of glass tubing $4^a$ forms the side walls of the drop chamber 4, suitable gaskets being used on its ends by which a tight joint is formed and maintained. An inlet 7 is provided, to which the pipe $7^a$ supplying lubricant to the lubricator is secured when the lubricator is put into use. An opening 8 in the diaphragm or partition 9 connects the supply chamber 3 with the drop chamber 4 and a needle valve 10 is employed to regulate and control the flow of the lubricant from the chamber 3 into the chamber 4. The needle valve 10 is provided with a screw threaded stem which extends through the plug or head 11 closing one end of the lubricator, and a gland 12 forms part of the plug 11, so as to prevent leakage to the opening in which the stem of the needle valve extends. A hand wheel $10^a$ is provided on the upper end of the valve 12 to manipulate the valve in regulating the flow of lubricant into the drop chamber 4, the flow being seen through the openings $4^b$ and glass tube $4^a$. An opening 13 in the diaphragm or partition 14 separating the drop chamber 4 from the pressure chamber 5 affords communication between these chambers, and an opening 15 in the lower end of the pressure chamber 5 provides a passage therefrom into the discharge chamber 6.

The pressure inlet opening 16 into the pressure chamber 5 is connected by means of suitable piping $16^a$ with a source of fluid pressure supply and the outlet opening 17 in the discharge chamber 6 serves to connect the conduit or pipe $17^a$ leading from the discharge chamber to the interior of the gas engine cylinder, or other point of use.

The opening 15 connecting the pressure chamber 5 with the discharge chamber 6 is normally closed by means of a disk valve 18, this valve 18 having a downwardly extending stem 19 which projects through the plug or head 20, which is screw threaded into the lower end of the lubricator tube. The gland 21 provides means for packing this stem and preventing leakage of the lubricant through the head 20 while permitting the valve 18 and its stem 19 to be reciprocated. Lugs or ears 22 are provided on the lubricator 2 to mount or secure the lubricator in position when applied for use.

Secured by straps 23 to the lubricator 2 is a bell crank 24. The bell crank 24 is pivoted by the pin 25 to the straps 23, and the arm

26 of the bell crank 24 is arranged to engage with the lower end of the valve stem 19. The other end of the bell crank is pivoted by the pin 27 to one end of the adjustable reciprocating reach rod 28 by which the bell crank is rocked to cause the valve 18 to reciprocate in its opening and closing movements. The lower end of the reach rod 28, the rod being mounted in bearings in such manner as will permit reciprocatory movement thereof, is provided on one end with an anti-friction roller 29. This roller 29 is arranged to engage with and be actuated by the cam or eccentric 30 mounted on the gas engine lay shaft 31.

The upper end of the valve 18 is provided with an extension 32 having a reduced portion 33, connecting the disk portion 34, the reduced portion 33 and disk 34 extending upwardly into the opening 13 when the valve 18 is in position to close the inlet opening 15 which connects the pressure chamber with the discharge chamber 6. The diameter of the valve extension 32 is such that it will close the opening 13, which will be closed when the valve 18 is lifted, so as to cut off communication between the chambers 4 and 5 while the passage between the chambers 5 and 6, remains open in this way preventing gaseous fluid pressure from the chamber 5 entering the drop chamber 4.

In the operation of our improved lubricator the outlet opening 17 is connected to the engine cylinder, or other point to which the oil or lubricant is to be supplied, and the inlet opening 16 is connected with a source of fluid pressure supply by suitable piping 16ª. The inlet 7 to the supply chamber 3 is connected to a tank, or other container in which a supply of lubricant is maintained, the lubricant being arranged to flow into the chamber 3 by gravity or under pressure, as is desired. The needle valve 10 is then adjusted by means of the hand wheel 10ª so as to regulate the flow or dropping of the lubricant into the sight feed drop chamber 4, the glass tube 4ª therein enabling the rate of flow being seen in adjusting the needle valve 10. When the engine is started in operation the lay shaft 31 will be constantly rotating, so that the eccentric 30 in engagement with the anti-friction roller 29 will reciprocate the reach rod 28. The reciprocating movement of the reach rod 28 rocks or oscillates the bell crank 24, so that with each oscillation of the bell crank its arm 26 engages with the lower end of the valve stem 19 and causes it to reciprocate the valve 18. When the valve stem 19 is lifted by the arm 26 the valve 18 is raised so as to momentarily connect the pressure chamber 5 with the discharge chamber 6. When the valve 18 is open the oil or other lubricant collected in the chamber 5 is forced out thereof by the fluid pressure constantly maintained in this chamber and, through the outlet opening 17 through the conduit 17ª into the engine cylinder to which the lubricator is applied. When the valve 18 is lifted the valve extension 32 also is raised so as to close the lower end of the opening 13 connecting the chamber 4 with chamber 5, and in this way prevent fluid pressure entering the chamber 4. The same lifting movement of valve 18 raises the disk portion 34 on the upper end of the valve 18 into the chamber 4. When in this position the lubricant collected in the drop chamber 4 between the valve opening movements will flow by gravity into the annular space then formed by the reduced portion 33 on the valve 18 and the walls of the opening 13. When the bell crank 24 is retracted, so as to permit the valve 18 to become seated by gravity and close the opening 15 connecting the chambers 5 and 6, the disk portion 34 again closes the opening connecting the chambers 4 and 5. The valve extension 32 is lowered by this movement so as to permit oil or other liquid lubricant collected in the annular space formed by the side walls of the opening 13 and the neck 33 to flow by gravity into the chamber 5.

The advantages of our invention will be apparent to those skilled in the art. By having the separate receiving chamber, drop chamber, pressure chamber and discharge chamber and having the valve arrangement controlling the several chambers by which communication is shut off between the drop chamber and the pressure chamber a regulated and uniform amount of lubricant is constantly supplied to the cylinder. The apparatus is simple and is easily kept in repair.

Modifications in the construction and arrangement of the parts can be made without departing from our invention. The manner of mounting the lubricator in place for use may be changed, the mechanism for opening and closing the valve may be varied and other changes may be made within the scope of the appended claims.

We claim:—

1. A lubricator comprising a casing having a discharge chamber, a drop chamber, and a pressure chamber, passages connecting the pressure chamber with the discharge and the drop chambers, means for closing said passages, said means being arranged to close the passage connecting one of said chambers with the pressure chamber when the other passage is open, and means operated from the engine lay shaft for actuating the passage closing means to open the passage between and connect the pressure and discharge chambers.

2. A lubricator comprising a casing having a discharge chamber, a drop chamber, and a pressure chamber, passages connecting the pressure chamber with the discharge and the drop chambers, means for closing said passages, said means being arranged to close the passage connecting the drop and pressure chambers when the passage between the pressure and discharge chambers is open, and means operated from the engine lay shaft for actuating the passage closing means to open the passage between and connect the pressure and discharge chambers.

3. A lubricator comprising a casing having a discharge chamber, a drop chamber, and a pressure chamber, passages connecting the pressure chamber with the discharge and the drop chambers, means for closing said passages, said means being arranged to close the passage connecting the drop and pressure chambers when the passage between the pressure and discharge chambers is closed and mechanical means for actuating the passage closing means to close the passage connecting the drop chamber and pressure chamber.

4. A lubricator comprising a casing having a discharge chamber, a drop chamber, and a pressure chamber, passages connecting the pressure chamber with the discharge and the drop chambers, means for closing said passages, said means being arranged to close the passage connecting the drop and pressure chambers when the passage between the pressure and discharge chambers is open and closed and mechanical means for actuating the passage closing means to close the passage connecting the drop chamber and pressure chamber.

5. A lubricator comprising a casing having a drop chamber, a pressure chamber, and a discharge chamber, said drop chamber communicating with the discharge chamber through the pressure chamber, inlets to the drop chamber and the pressure chamber, an outlet leading from the discharge chamber, and means for shutting off communication between the pressure chamber and the drop and discharge chambers, said means being adapted to prevent passage of fluid pressure from the pressure chamber into the drop chamber.

6. A lubricator comprising a casing having a drop chamber, a pressure chamber, and a discharge chamber, said drop chamber communicating with the discharge chamber through the pressure chamber, inlets to the drop chamber and the pressure chamber, an outlet leading from the discharge chamber, and means for shutting off communication between the pressure chamber and the drop and discharge chambers, said means being arranged to prevent passage of fluid pressure from the pressure chamber to the drop chamber, and permit flow of lubricant from the drop chamber to the pressure chamber.

7. A lubricator comprising a casing having a discharge chamber, a drop chamber, and a pressure chamber, passages connecting the pressure chamber with the discharge and the drop chambers, and a valve for closing said passages, said valve being arranged to close the passage connecting the drop and pressure chambers when the passage between the pressure and discharge chambers is open, and means whereby the valve is intermittently actuated to open said passages, said means including a reach rod operated by the engine lay shaft.

8. A lubricator comprising a casing having a discharge chamber, a drop chamber, and a pressure chamber, passages connecting the pressure chamber with the discharge and the drop chambers, and a valve for closing said passages, said valve being arranged to close the passage connecting the drop and pressure chambers when the passage between the pressure and discharge chambers is open and closed, and means whereby said valve is intermittently actuated, said means including a reach rod operated by the engine lay shaft.

9. A lubricator having a discharge chamber, a drop chamber, and a pressure chamber intermediate the discharge chamber and the drop chamber and connected with both, a valve adapted to open and close communication between the several chambers and mechanical means for controllably supplying pressure to the discharge chamber when the passage between the pressure chamber and the discharge chamber is open.

In testimony whereof, we have hereunto set our hands.

JAMES HORTON.
THOMAS W. KEEN.

Witnesses:
G. W. McCLEERY,
OBE. STEVENS.

Copies of this patent may be obtained for five cents each, by addressing the "Commissioner of Patents, Washington, D. C."